United States Patent
Graefe et al.

[11] Patent Number: 5,935,287
[45] Date of Patent: Aug. 10, 1999

[54] GOB DELIVERY APPARATUS FOR I.S. GLASSWARE FORMING MACHINE

[75] Inventors: Andreas Graefe, Seggebruch; Eckhard Möller; Manfred Struckmeier, both of Obernkirchen, all of Germany

[73] Assignee: The Firm Hermann Heye, Obernkirchen, Germany

[21] Appl. No.: 08/776,488

[22] PCT Filed: Jan. 30, 1996

[86] PCT No.: PCT/EP96/00348

§ 371 Date: Jan. 23, 1997

§ 102(e) Date: Jan. 23, 1997

[87] PCT Pub. No.: WO96/37445

PCT Pub. Date: Nov. 28, 1996

[30] Foreign Application Priority Data

May 26, 1995 [DE] Germany ............... 295 08 465 U

[51] Int. Cl.$^6$ ............................................ C03B 7/16
[52] U.S. Cl. ............................. 65/225; 65/303; 65/304
[58] Field of Search .................... 65/207, 225, 304, 65/303, 72, 126, 127, 165; 193/15, 22, 41; 414/224

[56] References Cited

U.S. PATENT DOCUMENTS

| | | |
|---|---|---|
| Re. 15,600 | 5/1923 | Lorenz . |
| 1,575,370 | 2/1926 | Lorenz ...................................... 65/225 |
| 1,670,770 | 5/1928 | Ingle . |
| 1,755,397 | 4/1930 | Hunter . |
| 2,669,805 | 2/1954 | Rowe . |
| 2,810,236 | 10/1957 | Mumford ................................. 65/304 |
| 3,198,616 | 8/1965 | Havens . |
| 3,341,315 | 9/1967 | Patschorke ............................... 65/304 |
| 5,213,602 | 5/1993 | Foster et al. ............................. 65/304 |
| 5,298,049 | 3/1994 | Meyer ...................................... 65/225 |
| 5,599,370 | 2/1997 | Struckmeier et al. .................... 65/207 |

FOREIGN PATENT DOCUMENTS

| | | |
|---|---|---|
| 0480642 | 4/1992 | European Pat. Off. . |
| 0564090 | 10/1993 | European Pat. Off. . |
| 0650935 | 5/1995 | European Pat. Off. . |
| 0654451 | 5/1995 | European Pat. Off. . |
| 0658518 | 6/1995 | European Pat. Off. . |
| WO 92/20631 | 11/1992 | WIPO . |

*Primary Examiner*—Steven P. Griffin
*Attorney, Agent, or Firm*—Synnestvedt & Lechner LLP

[57] ABSTRACT

A gob delivery apparatus in which gobs of molten glass are conducted from a gob feeder through a gob delivery system into a mold of an I.S. glassware forming machine. The gob delivery system includes a scoop, a substantially flat slide member and a deflector. The scoop catches the gobs and directs them downwardly at an angle. The slide member is supported fixedly on the machine and includes a downwardly angled upper slide surface for the gobs. An upper end of the deflector receives the gobs directly from a lower end of the slide member.

24 Claims, 9 Drawing Sheets

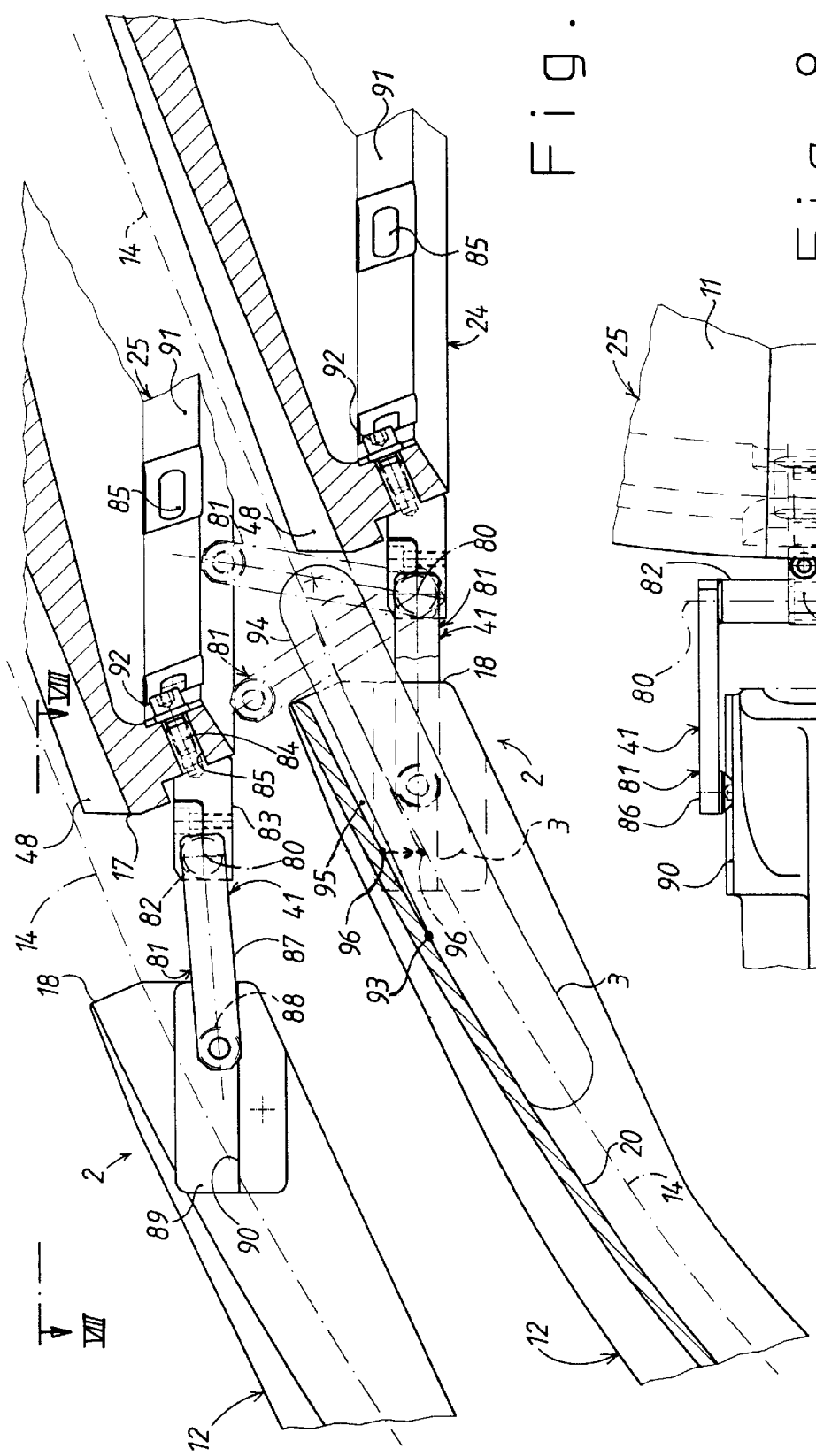
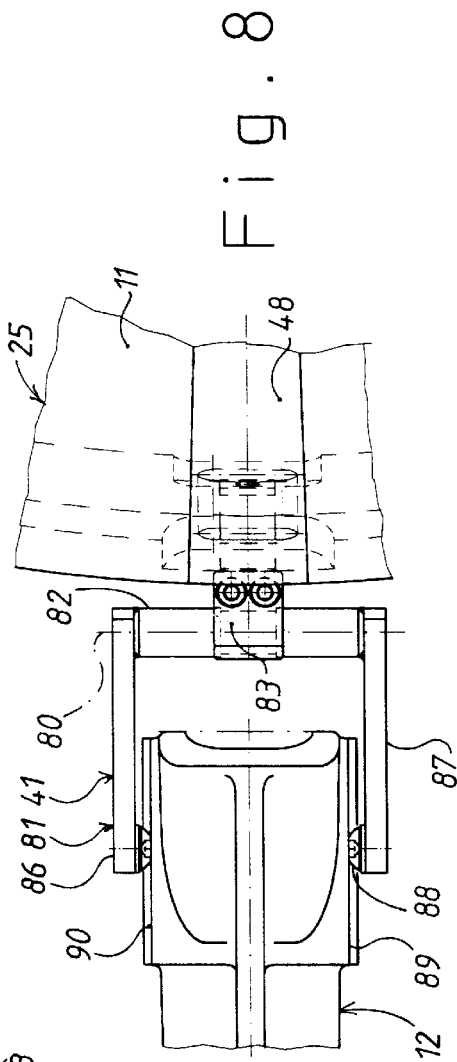

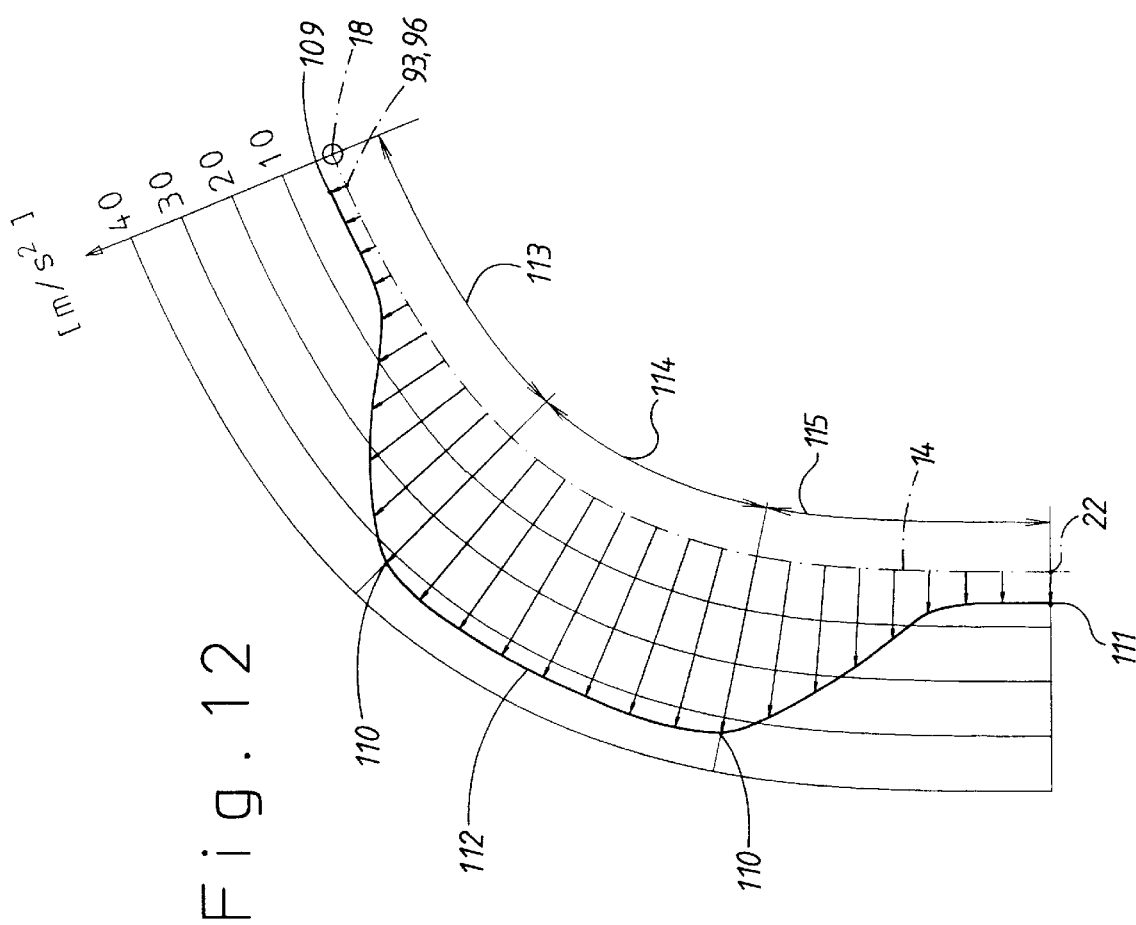

GOB DELIVERY APPARATUS FOR I.S. GLASSWARE FORMING MACHINE

BACKGROUND

The invention relates to an apparatus for conducting gobs of molten glass to a mold of an I.S. glassware forming machine.

In one known apparatus of this type (WO 92/20631 A1 of the applicants) a trough is arranged between each slide member and the associated deflector. Each trough is supported at its upper end by means of a universal joint from a holder which is fixed to the machine. The lower end of each trough is guided in a vertical chute of the deflector and can be raised and lowered by an adjusting device in order to adapt it to the particular gob shape, whereby the angle of the trough changes on the one hand in relation to its slide member and on the other hand in relation to its deflector.

From U.S. Pat. No. 5,298,049A, it is known to make up a delivery system from a pivotable scoop together with conventional troughs which are stationary in use and deflectors. Each deflector is adjustable exclusively in a horizontal plane relative to the associated mold (column 1, lines 60 to 63; column 3, lines 54 to 57). Each trough is only supported fixedly on the machine at its upper end, while its lower end and the whole of the associated deflector are carried by a common holder. The holder is suspended from a machine-fixed carrier by means of a universal joint, so as to be movable within limits, in order to facilitate the adjustment of the deflector about two mutually perpendicular, horizontal axes and about a vertical axis.

From U.S. Pat. No. 1,670,770A, delivery systems are known which each comprise a scoop and an adjustably mounted trough and deflector (page 1, lines 82 and 83). Details of how the adjustment is made are not given.

From U.S. Pat. No. 5,213,602A, a gob delivery system is known comprising a scoop, a trough and a deflector. The trough is pivotally connected to the machine frame at the top by means of a pin. The lower end of the trough rests on a carriage which is adjustable in height by means of a setting screw. The carriage is displaceable horizontally on the machine frame by means of a setting screw. A spindle of the carriage extends substantially parallel to the trough and carries the deflector which is adjustable along the spindle.

The gob delivery system consisting of scoop, trough and deflector which is known from U.S. Pat. No. 1,755,397 corresponds to the delivery system which is described in U.S. Pat. No. 1,670,770A (page 2, lines 25 to 30).

Comparatively short troughs can be necessary, particularly for the middle sections of larger I.S. glassware forming machines. In the case of such comparatively short troughs whose lower ends must be raised or lowered in order to adapt to different gob diameters, this leads to the aforesaid changes in angle of the trough, on the one hand in relation to its slide member and on the other hand in relation to its deflector. Because of the shortness of the troughs, this leads to particularly large angular changes and correspondingly disruptive kinks in the path of movement of the gobs. This has a correspondingly negative effect on the gobs themselves. Accordingly, it is an object of the present invention to completely avoid the need for comparatively short troughs.

SUMMARY OF THE INVENTION

By means of the features of the present invention, the disadvantages discussed above are eliminated. In broad terms, the invention provides a delivery apparatus having a scoop, a substantially plate-like slide member, and a curved deflector which deflects the gobs coming from the slide member downwards and coaxially with respect to a longitudinal axis of the mold. The deflector is positioned to receive the gobs directly from the slide member, thereby eliminating the need for a trough. In this new way, all gob delivery systems of an I.S. glassware forming machine with only comparatively few sections, for example with four to six sections, can be constructed without troughs.

BRIEF DESCRIPTION OF THE DRAWINGS

These and other features and advantages of the invention will now be described in more detail with reference to the embodiments which are given by way of example and which are shown in the drawings:

In the drawings:

FIG. 7 is the sectional view taken along the line VII—VII in FIG. 6;

FIG. 8 is the plan view taken along the line VIII—VIII in FIG. 7;

DETAILED DESCRIPTION OF THE INVENTION

Figure 1:
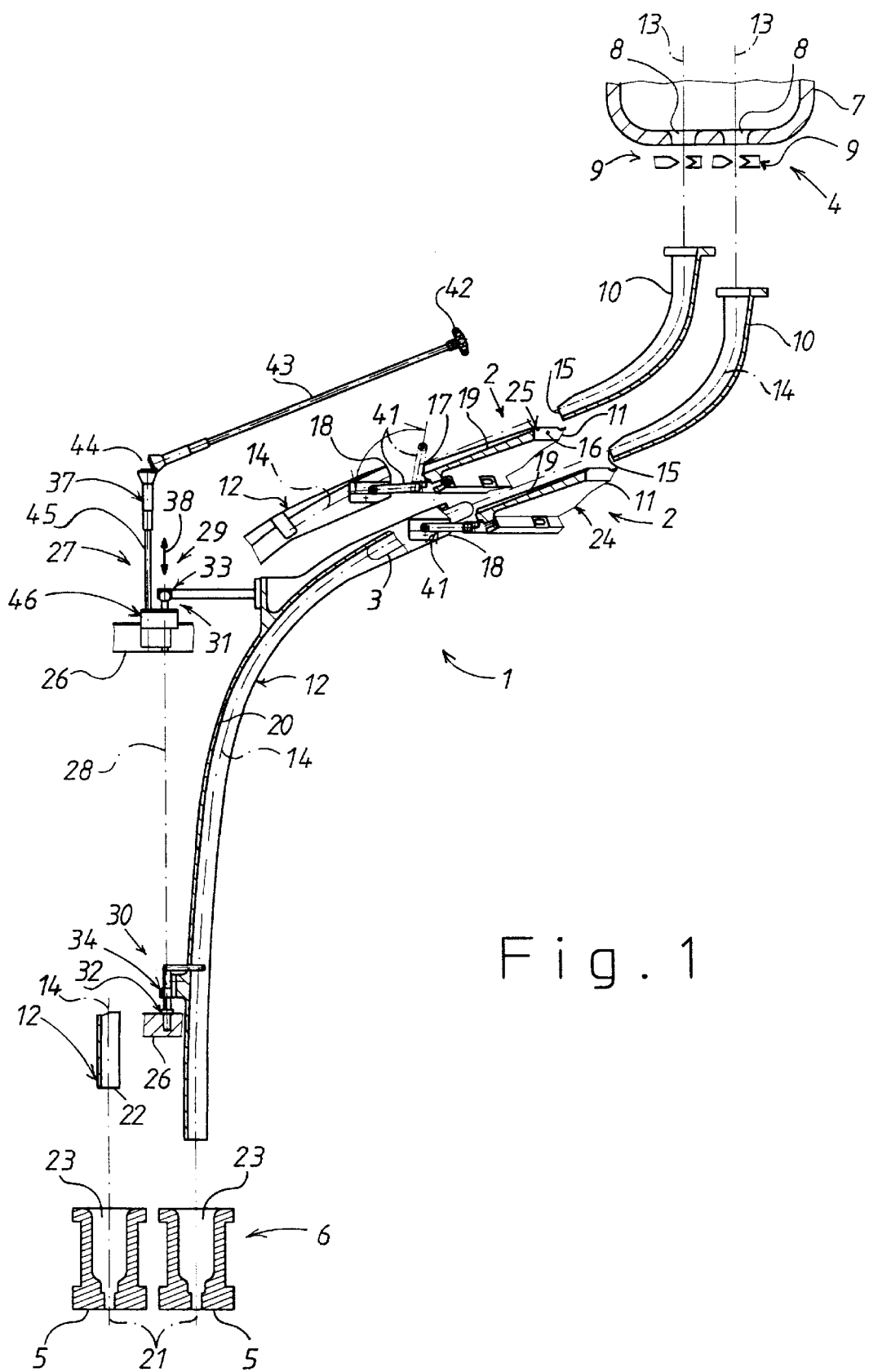
FIG. 1 is the sectional view taken along the line I—I in FIG. 2 through a gob delivery apparatus.

FIG. 1 shows schematically a gob delivery apparatus 1 comprising two identical gob delivery systems 2 for the transfer of gobs 3 of molten glass from a gob feeder 4 into respective molds 5, particularly parison molds, of a section 6 of an I.S. glassware forming machine which is not otherwise shown. This I.S. glassware forming machine works in the so-called double-gob mode, in which two gobs 3 are supplied at approximately the same time to each section 6 in succession. However, the invention extends equally to I.S. glassware forming machines whose sections are supplied respectively with more than two gobs at approximately the same time or with only one gob.

The gob feeder 4 comprises, in a manner known per se, a feeder head 7 from each of whose gob outlets 8 comes a strand of molten glass which is cut periodically by a shears 9 into the gobs 3.

Each gob delivery system 2 comprises a scoop 10, a slide member 11 and a deflector 12.

Each scoop 10 is in this case pivotable about a longitudinal axis 13 of the associated gob outlet 8 in a manner which is known per se and the details of which are not shown here. The scoop 10 receives all the gobs 3 which are severed by its shears 9 and conducts these gobs in succession to the rest of the subsequent gob delivery systems 2 in accordance with the pivot setting of the scoop. Typically, each scoop 10 feeds gobs 3 in succession to the associated gob delivery systems 2 of all sections of the I.S. glassware forming machine.

Each gob 3 passes through its delivery system 2 with its longitudinal axis traversing a path of movement 14 which is indicated by chain-dotted lines in FIG. 1. The scoop 10 is curved and deflects the gobs 3 downwards at an angle. Between a lower end 15 of the scoop 10 and an upper end 16 of the slide member 11 there is a gap of for example 65mm. In a similar manner, there is a gap between a lower end 17 of the slide member 11 and an upper end 18 of the deflector 12. The gobs 3 cross these gaps in free flight and land at a comparatively shallow angle of impact first on a downwardly inclined upper slide surface 19 of the slide member 11 and then against a slide surface 20 in the deflector 12. This slide surface 20 has a special curvature, to which reference will be made again later in more detail. The slide surface 20 deflects the gobs 3 downwards, coaxially with respect to a longitudinal axis 21 of the mold 5. The gobs 3 move from the lower end 22 of the deflector 12 in free fall into a mold recess 23 of the mold 5.

The gob delivery apparatus 1 according to FIG. 1 is designed for the aforementioned double-gob mode of operation, where two gobs 3 fall into the associated scoops 10 substantially simultaneously along the two longitudinal axes 13 and then are conducted through the rest of the associated delivery systems 2 into the respective molds 5. The two gob delivery systems 2 are arranged in a nested configuration one above the other, with the central part of the upper deflector 12 being omitted from FIG. 1 for greater clarity of illustration.

The slide members 11 are substantially plate-like as seen in FIGS. 1, 2, 6, 7 and 8. They have a substantially flat upper slide surface 19 on which the gobs slide to the deflector 12.

The slide members 11 of all the lower deflectors are preferably connected together forming a slide unit 24 as shown in the drawings. In the same manner, all the slide members 11 of the upper deflectors 12 are preferably connected together to a slide unit 25. The slide units 24, 25 are each supported fixedly on the machine, as is described in the aforementioned publication WO 92/20631 A1 and which therefore does not need to be described again here.

Each deflector 12 is carried by a first adjustment device 26 by means of which the deflector 12 can be adjusted in a plane which is perpendicular to the longitudinal axis 21 of the mold 5. The details of this adjustment are likewise given in the aforesaid publication WO 92/20631 A1 and therefore again will not be described in further detail here.

Each deflector 12 is also arranged to be raised or lowered by means of a second adjustment device 27. This rising or sinking is effected at a convex rear face of the associated deflector 12, preferably along a vertical adjustment axis 28. Bearing regions 29 and 30 which are spaced from one another are provided along the adjustment axis 28. A first bearing element 31 and 32 of each bearing region 29, 30 is carried by the first adjustment device 26 and is adjustable in the above-mentioned plane perpendicular to the longitudinal axes 21. A second bearing element 33 and 34 of each bearing region 29, 30 is secured in contrast to the deflector 12.

The first bearing element 31 comprises a ball member 35 (FIG. 3), and the associated second bearing element 33 is provided with a recess 36 in the shape of a cup (FIG. 3) which engages over the ball member 35 from above. By means of a drive 37, the ball member 35 can rise or sink in the directions indicated by a double-headed arrow 38 parallel to the vertical adjustment axis 28. The further first bearing element 32 of the bearing region 30 comprises a bearing bolt 39 (FIG. 4) which is coaxial with respect to the adjustment axis 28. A bearing eye 40 (FIG. 4) is movable relative to the bearing bolt 39.

The upper end 18 of each deflector 12 is aligned by means of an alignment device 41 with the gobs 3 arriving via the slide member 11. Details of the alignment device 41 will be given hereinafter in connection with FIGS. 6 to 8.

Each drive 37 for the height adjustment of the associated deflector 12 can be actuated from an accessible control platform which is not shown in FIG. 1. For this, a handwheel 42 is rotated, which, by way of a shaft 43, an angled gear 44 and a further shaft 45 controls a height adjustment gearing 46 whose details will be described later in connection with FIG. 3. Alternatively, it is possible to actuate the drive 37 from the plant floor.

In all the Figures of the drawings, the same or equivalent parts are indicated by the respective same reference numerals.

Figure 2:
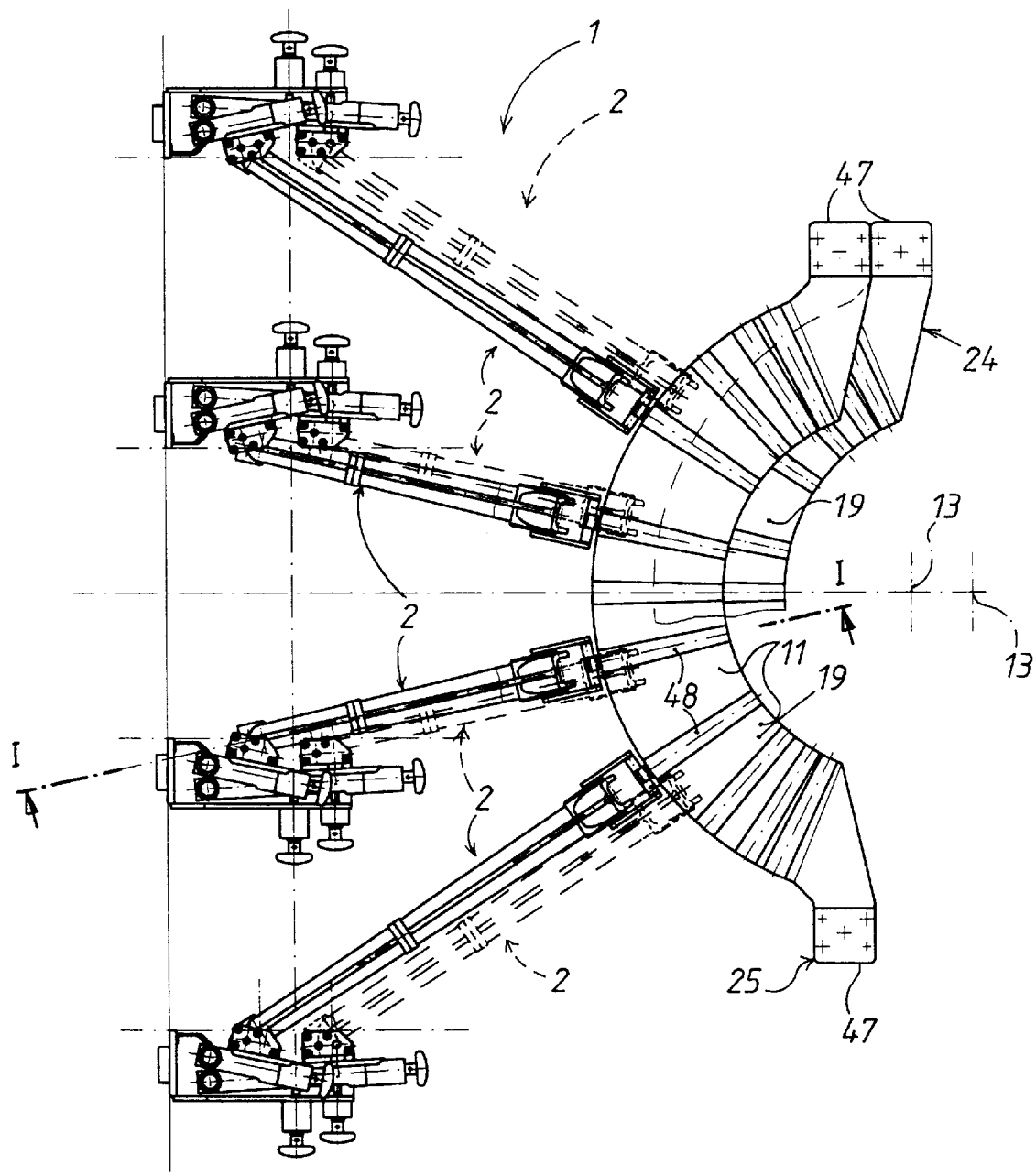
FIG. 2 is the plan view of the gob delivery apparatus according to FIG. 1, and showing further, similar gob delivery devices for further sections of an I.S. glassware forming machine.

The gob delivery apparatus 1 shown in FIG. 2, for a 10-section I.S. glassware forming machine which is not shown in any greater detail, has two gob delivery systems 2 arranged above one another, corresponding to FIG. 1, for each of the four sections adjacent to the center. The respective three outer sections to each side of the delivery systems 2 shown in FIG. 2 are supplied with gobs by delivery systems corresponding to the aforementioned WO 92/20631 A1, each using a trough, not shown in FIG. 2, between the slide unit 24, 25 and the associated deflector. No use is deliberately made of such a trough in the four sections of the I.S. glassware forming machine which are adjacent to the center and which are shown in FIG. 2.

Each slide unit 24, 25 comprises mounting pieces 47 at its lateral ends. In the upper slide surface 19 of each slide member 11 is located a slide channel 48 in which the gobs 3 slide down over the respective slide members 11. Thus it is seen that the slide units 24, 25 include the slide members 11, each of which has a slide channel 48 as shown. By means of these slide channels 48, the guidance of the gobs 3 and their introduction into the associated deflectors 12 is improved.

Figure 6:
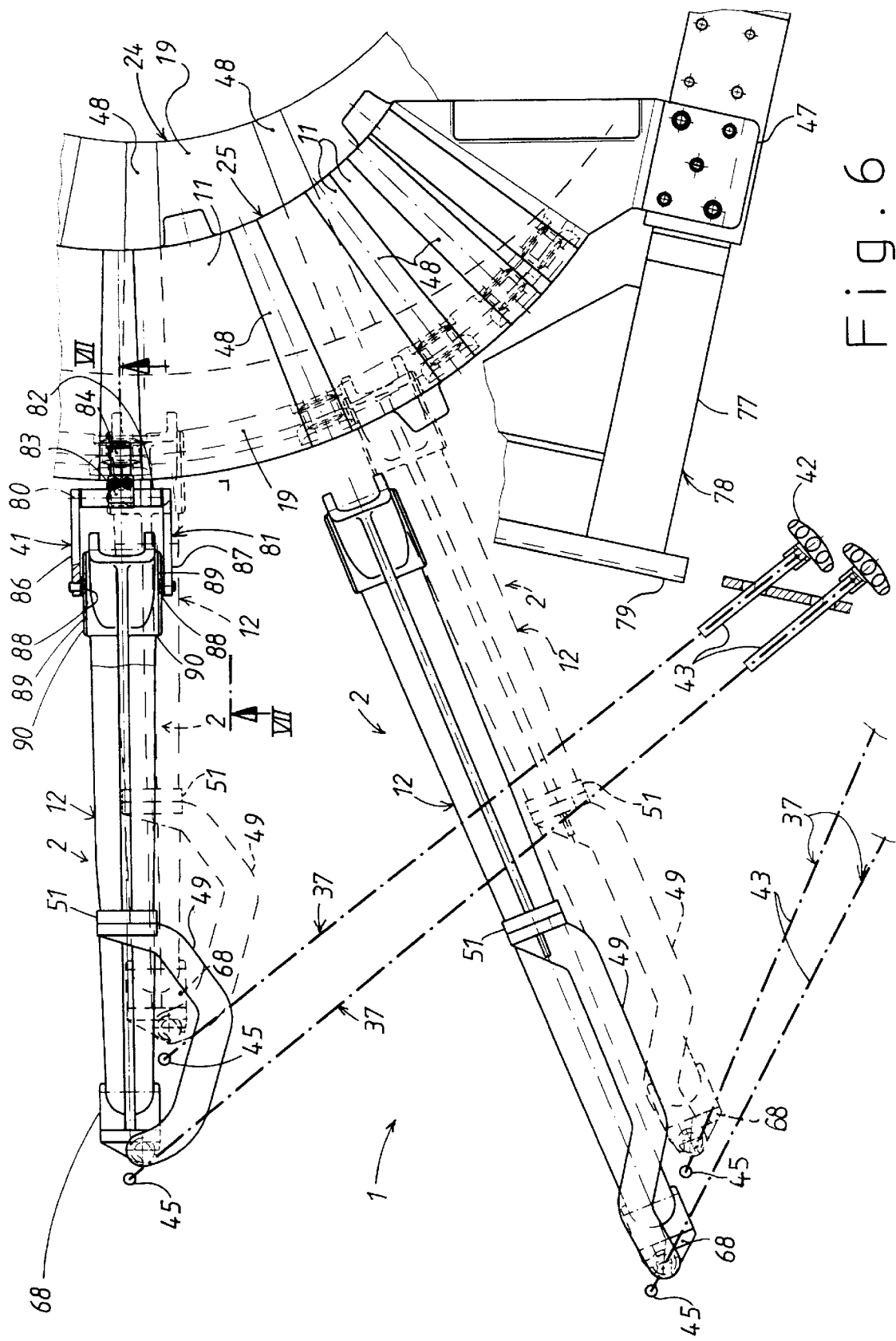
FIG. 6 shows a part of FIG. 2 on an enlarged scale.

As illustrated in FIGS. 2, 6, and 7, the slide channels 48 are part-circular in cross section and have a depth that increases from one end of the slide member to the other end.

Figure 3:
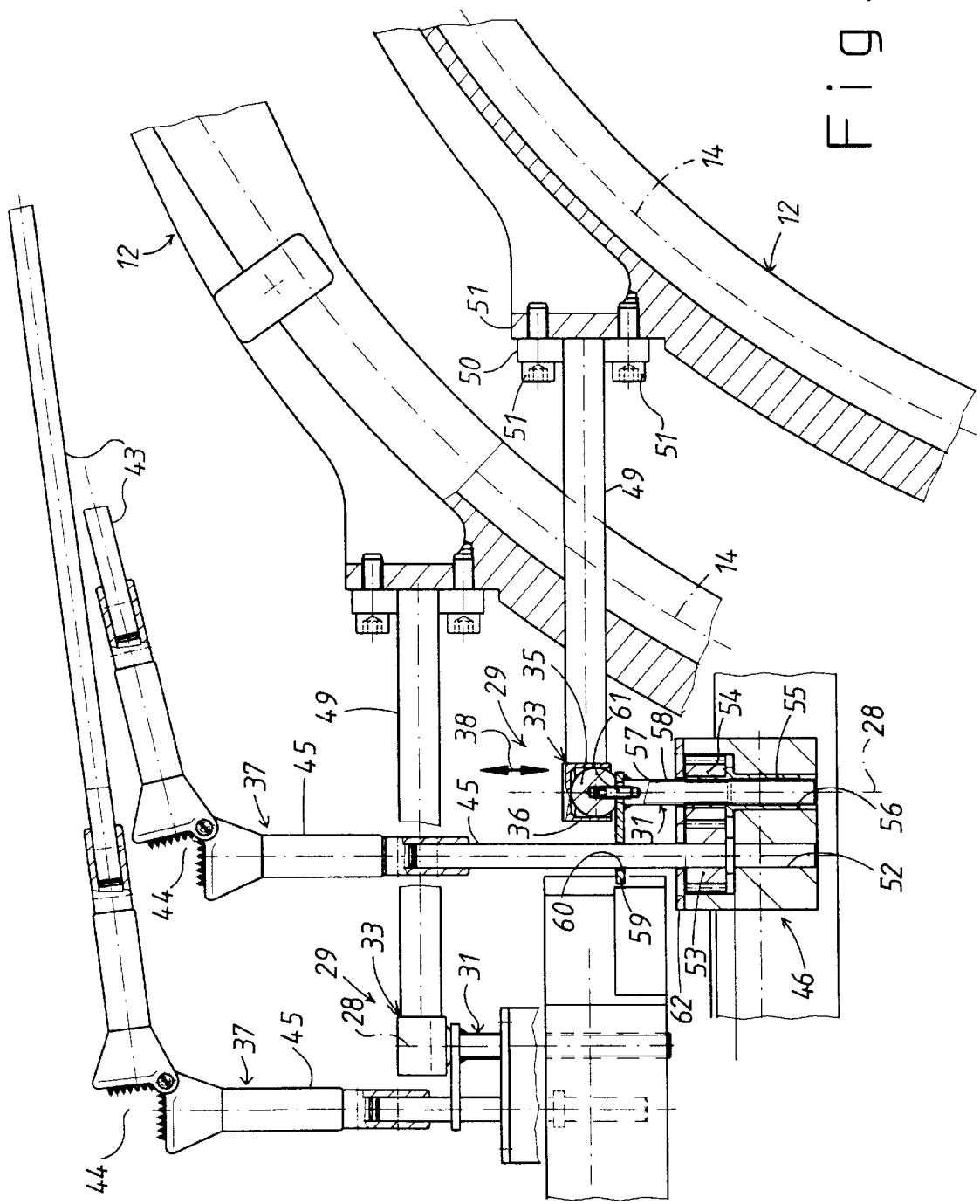
FIG. 3 shows drives for raising or lowering deflectors of the delivery apparatus.

FIG. 3 shows details of the bearing region 29 and of the drive 37.

The recess 36 is a constituent part of an arm 49 which is secured to a receiving plate 51 of the deflector 12 by screws 51 via a mounting plate 50.

The shaft 45 is made in two parts and has its lower end rotatably mounted in a bearing bore 52 of the height adjustment gearing 46. A gearwheel 53 is rigidly connected to the shaft and meshes with a gearwheel 54. The gearwheel 54 is secured to a sleeve 55 which is rotatably mounted at the bottom in a bearing bore 56 of the height adjustment gearing 46. The sleeve 55 is provided with an internal thread which is in engagement with an external thread 57 on a shaft 58. The shaft 58 is arranged coaxially with respect to the vertical adjustment axis 28 and is prevented from rotation about its longitudinal axis by a rest 59 which has a bore 60 for the shaft 45 and which is soldered to the upper end of the shaft 58. By means of a bore through the rest 59, a threaded pin 61 extends into an upper threaded bore of the shaft 58 coaxially with respect to the vertical adjustment axis 28. The threaded pin 61 is held in its screwed-in position, for example by adhesive in the region of the threads. The ball member 35 is screwed into contact with the rest 59 by means of an internal thread on the upper end of the threaded pin 61, and, as required, is held in this position, likewise by adhesive in the threads.

A rotation of the shaft 45 results in a corresponding rotation of the shaft 58, and moreover the ball member 35 rises or sinks in the directions indicated by the double-headed arrow 38 corresponding to the pitch of the external thread 57. The height adjustment gearing 46 is screened at the top by a cover 62 which is screwed into place.

Figure 4:
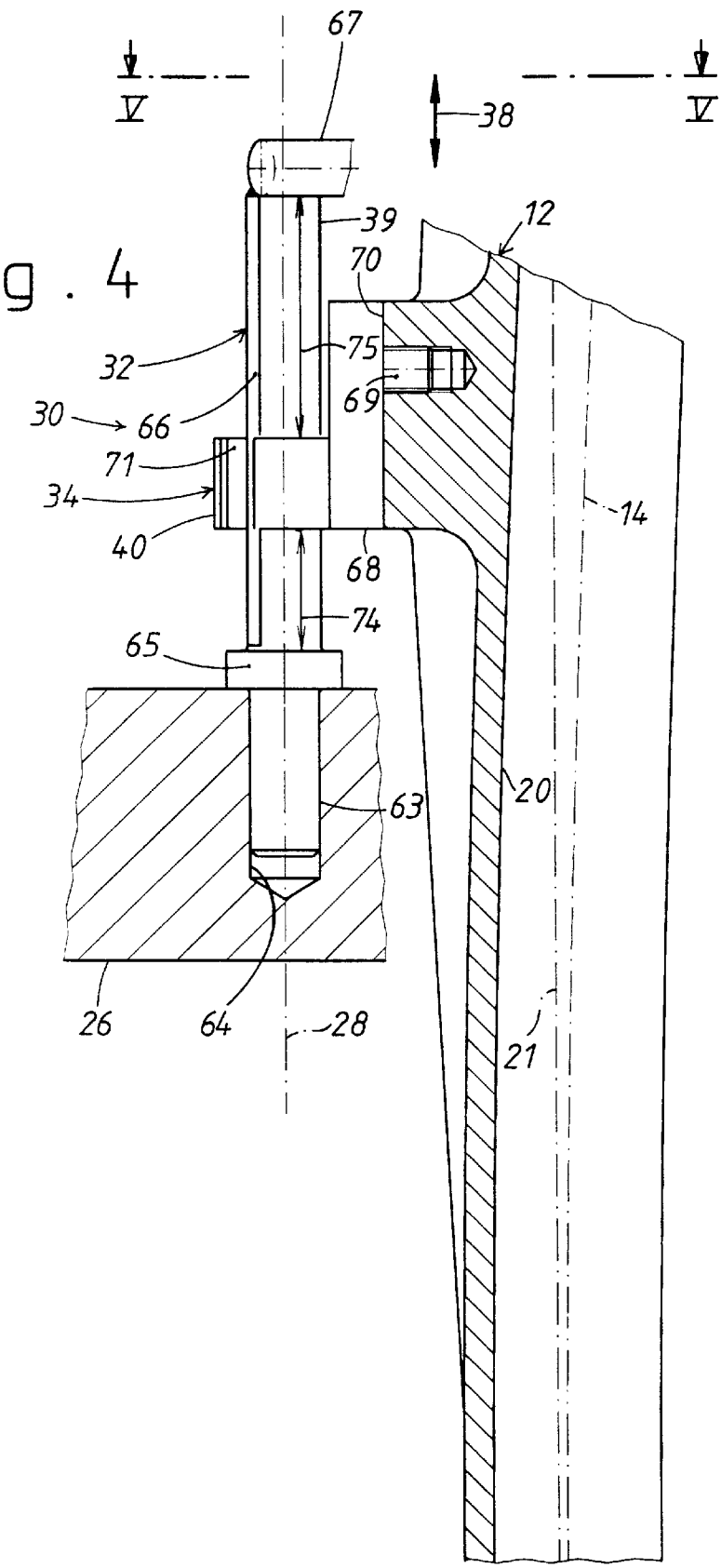
FIG. 4 is a view, partly in section, of a lower pivot bearing of a deflector.

FIG. 4 shows details of the bearing region 30 on an enlarged scale. The bearing bolt 39 has at the bottom a bearing pin 63 which engages in a bearing bore 64 of the first adjustment device 26. The bearing bolt 39 is pivotable about its longitudinal axis coaxial with the vertical adjustment axis 28, with a collar 65 resting on the first adjustment device 26 establishing the height position of the bearing bolt 39. The bearing bolt 39 is formed as a circular cylinder having a flat surface 66 on one side, and onto which a handgrip 67 is welded at the top to extend transversely.

The bearing eye 40 of the second bearing element 34 is provided with a socket mount 68 and is fixed by screws 69 to a mounting surface 70 on the deflector 12. The bearing eye 40 includes a lateral aperture 71 whose clear width 72 (FIG. 5) is equal to or somewhat greater than a smallest transverse dimension 73 (FIG. 5) of the bearing bolt 39.

By means of the drive 37 (FIG. 3) the deflector 12 can rise or sink in the directions as indicated by the double-headed arrow 38 parallel to the vertical adjustment axis 28. In FIG. 4, with the indicated, randomly chosen relative positions of the bearing eye 40 and bearing bolt 39, a maximum stroke 74 for the sinking movement and a maximum stroke 75 for the rising movement are available. These strokes 74, 75 are, in total, so dimensioned that it is possible to adapt the height of the deflector 12 to any diameter of gob 3 which will arise in practice.

Figure 5:
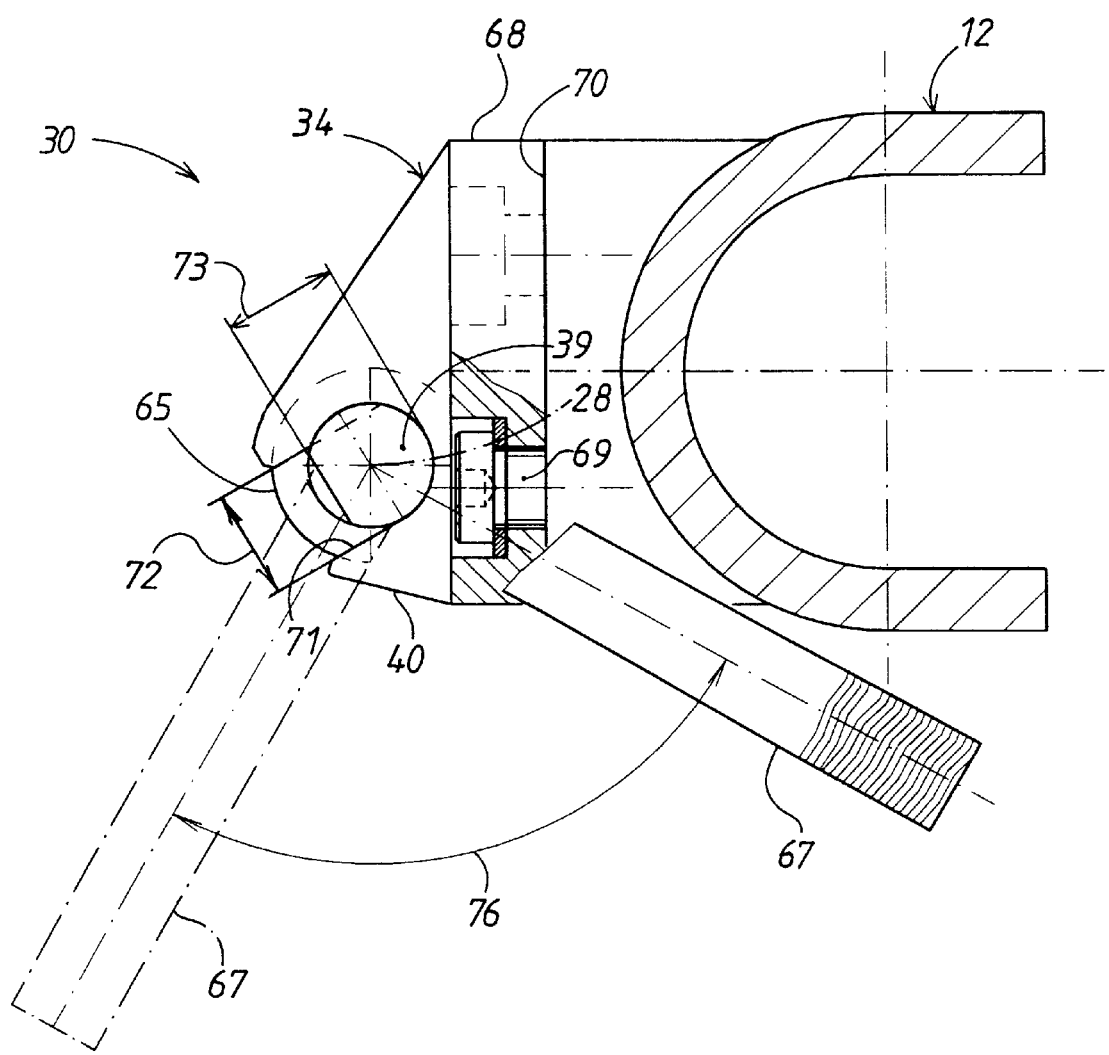
FIG. 5 is the sectional view taken along the line V—V in FIG. 4.

FIG. 5 illustrates the detailed construction of the bearing region 30. A part of the handgrip 67 is indicated in FIG. 5 by solid lines in the position in which it locks the bearing region 30. The handgrip 67 can pivot through an angle 76 into a position which is indicated in FIG. 5 by chain-dotted lines in which the bearing region 30 is unlocked. The angle 76 amounts to approximately 90°. Only in the position of the handgrip 67 indicated by chain-dotted lines in FIG. 5 can the bearing eye 40 be freed from the bearing bolt 39, as will be described later.

FIG. 6 shows the gob delivery systems 2 of the lower half of FIG. 2 on an enlarged scale.

The slide units 24, 25 are screwed by their mounting pieces 47 each to one limb 77 of a holding device 78 which is U-shaped in plan view. The holding device 78 is secured at its left-hand base surface 79 in FIG. 6 to a stationary scoop beam which is not shown in FIG. 6.

In FIG. 6, in order to improve the clarity of the drawing, only the alignment device 41 for the uppermost gob delivery system 2 is shown. Identical alignment devices 41 are used for the remaining gob delivery systems 2.

Each alignment device 41 comprises a fork 81 which can be raised and lowered about an axis 80 which is fixed in relation to the machine. A shaft 82 of the fork 81 is rotatably mounted in a bearing block 83. The bearing block 83 is held fast by a pin in an elongate hole 85 (FIG. 7) extending in the circumferential direction of the associated slide unit 24, 25. Respective limbs 86 and 87 of the fork 81 are fixed at the ends of the shaft 82. The free ends of the limbs 86, 87 each carry a screw-type slide member 88 which is in sliding contact with lateral slide surfaces 89 of the upper end 18 of the deflector 12. At the bottom, on each slide surface 89, there is provided a substantially horizontal step 90 on which the respective slide member 88 is supported. Thus, the fork 81 is prevented from falling downwards.

For clarity of the illustration, the lower gob delivery system 2 in FIG. 6 is shown in broken lines.

The plan view of FIG. 6 shows that the arms 49 from section to section of the I.S. glassware forming machine are differently cranked. This cranking has the purpose of preventing collisions of the arms 49 with parts of the drives 37 during the adjustment processes.

FIG. 7 shows further details of the alignment device 41.

The elongate holes 85 are provided in a lower skirt 91 of the slide units 24 and 25 and are inclined at an angle upwards. Each pin 84 is provided with an internal thread into which a screw 92 engaging it from behind the skirt 91 is screwed from the right as shown in FIG. 7. Before the tightening of the screw 92, the pin 84 is displaced laterally in the elongate hole 85 in such a manner that an optimum alignment of the associated slide channel 48 with the deflector 12 is achieved. For this purpose, the fork 81 is lowered into its operating position shown in solid lines in FIG. 7 in which the slide members 88 rest on the steps 90 and are in contact with the slide surfaces. In this position the screw 92 is tightened and the system thus adjusted is secured.

In the case of the gob delivery system 2 which is shown at the bottom in FIG. 7, the illustrated piece of the deflector 12 is shown in longitudinal section. The gob 3 shown in solid outline is the gob with the maximum dimensions. This gob makes its first contact with the slide surface 20 in its travel along the path 14 at a point 93. At this instant, somewhat more than half the length of the gob is already located within the deflector 12. An external surface 94 of the gob 3 which lies opposite the slide surface 20 forms a wedge-shaped gap 95 at the upper end 18 of the deflector 12 up to the point 93. The point 93 is arranged deliberately so far from the upper end 18 of the deflector 12 that the gob 3 in each case has already entered into the deflector 12 to a considerable part of its length before it first makes contact with the slide surface 20. When this contact occurs the gob 3 is slowed down. Especially with comparatively long gobs 3, there could otherwise be the tendency for the rearward end of the gob 3 to rise and in the extreme case bend about the upper end 18 of the deflector 12. This would lead to undesirable changes in shape of the gob 3. The same applies if the gob 3 does not impact at the point 93 or at another point on the slide surface 20, but instead strikes bluntly against the upper end 18 of the deflector 12. In this case, there would be no wedge-shaped gap 95 and one would permanently have to accept the danger that the gobs would be severely deformed or that the delivery system 2 might even be blocked.

In the lower gob delivery system 2 of FIG. 7, the gob 3 with the minimum dimensions is also indicated, by broken lines. If, in switching from the maximum size gob to the minimum size gob, the height setting of the deflector 12 is left as it is shown in FIG. 7, then the minimum size gob 3 would, by following a lower path of movement 14, fly a comparatively large distance into the deflector 12 before it would make first contact with the slide surface 20 at a position significantly beyond the point 93. This would be undesirable, as will be explained hereinafter in connection with FIG. 9.

Consequently, upon transfer to the minimum size gob 3 or to any other size of gob 3 which is smaller than the maximum size gob 3, the deflector 12 is lowered, until a desired point 96 of first contact of the minimum size gob 3 with the slide surface 20 is arranged at the necessary deeper position likewise indicated in FIG. 7. The broken line minimum size gob 3 is indicated in FIG. 7 at exactly the instant at which it makes first contact with the point 96. In this state, the minimum size gob 3 has more than half its length already present within the deflector 12.

By the contact with the slide surface 20 the gobs 3 are flattened to a greater or lesser degree, as is illustrated in the forward region of the maximum size gob 3 which is shown in FIG. 7.

FIG. 8 shows details of the alignment device 41 of FIG. 6, on an enlarged scale.

From time to time the deflectors 12 have to be changed. This is accomplished as follows.

The fork 81 of the associated alignment device 41 is pivoted upwards out of contact with the deflector into the position indicated by chain-dotted lines in FIG. 7, in which it is in contact with the slide units 24, 25. For the upper deflector 12 of the two deflectors 12 of each section, the handgrip 67 can then be pivoted from the solid line securing position shown in FIG. 5 into the chain-dotted release position. After this, the deflector 12 is raised as a whole sufficiently far that the recess 36 (FIG. 3) is completely freed from the ball member 35. Finally, the deflector 12 is moved sideways, until the smallest transverse dimension 73 of the bearing bolt 39 has left the lateral aperture 71 of the bearing eye 40. At this instant the deflector 12 is free and can then be replaced by a new deflector 12 by following the reverse procedure.

For the exchange of the lower deflector 12 in FIG. 7, in order to avoid a collision with parts of the apparatus arranged above it, the procedure must be carried out in another way. Here, as is indicated by chain-dotted lines in FIG. 7, the fork 81 is first pivoted upwards and deposited in contact with the slide unit 24. Then, in contrast to the above-mentioned procedure, the lower deflector 12 is pivoted about the vertical adjustment axis 28 until it can no longer collide with the parts of the apparatus located above it when subsequently lifting it out. Then, in the manner described above, one can proceed with the opening of the handgrip 67.

Figure 9:
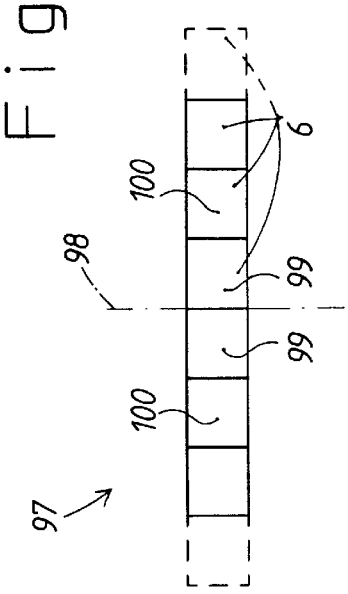
FIG. 9 is the schematic plan view of an I.S. glassware forming machine having an even number of sections.

FIG. 9 shows an I.S. glassware forming machine 97 having an even total number of sections 6. On each side of a central transverse plane 98 there is arranged a central section 99, on the outside of each of which there is fitted a flank section 100. The I.S. glassware forming machine 97 can consist of just the two central sections 99, 99, or with additionally the two flank sections 100,100, or with the addition of further, outwardly lying sections 6. Either all the sections of the I.S. glassware forming machine 97 can be equipped in the manner according to the invention, or alternatively only those sections can be so equipped which are located adjacent to the central transverse plane 98.

Figure 10:
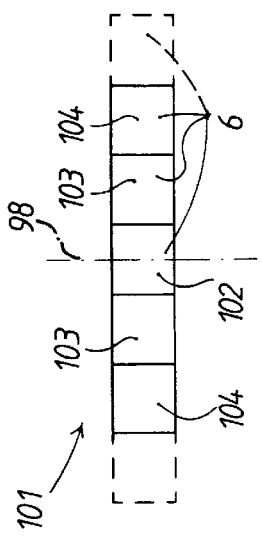
FIG. 10 is the schematic plan view of another I.S. glassware forming machine having an odd number of sections.

FIG. 10 shows an I.S. glassware forming machine 101 with an odd total number of sections 6. A central section 102 is arranged in the central transverse plane 98. On each side of the central section 102 is located a neighbouring section 103 to which is annexed, on each side, a flank section 104. The I.S. glassware forming machine 101 can consist of just the sections 102, 103 or of the sections 102 to 104 or alternatively of further sections 6 which are indicated in broken lines in FIG. 10.

Figure 11:
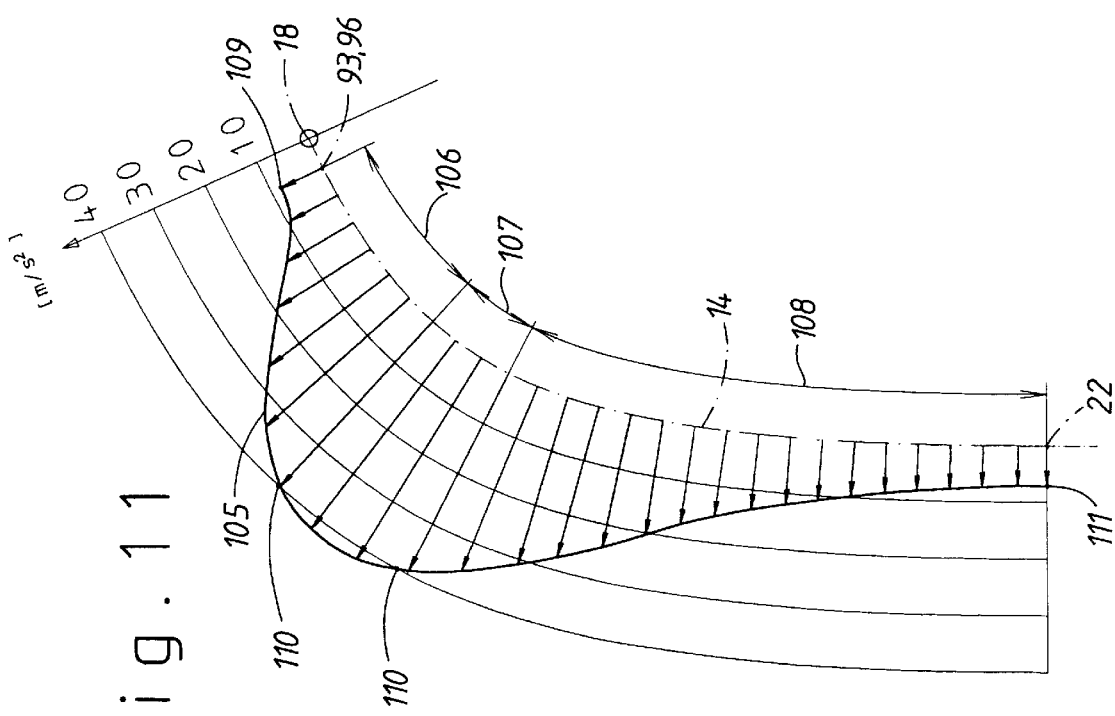
FIG. 11 is a diagram showing a typical plot of the normal acceleration acting on the gobs in a deflector of a section near the center; and, FIG. 12 is a diagram of a typical plot of the normal acceleration acting on the gobs in a deflector of a centrally adjacent section which lies further from the center.

In each of FIGS. 11 and 12 is shown a diagram of a typical plot of the normal acceleration acting on the gobs 3 in the deflectors 12. The normal acceleration is marked as the ordinate of the coordinate system, while the abscissa shows the path of movement 14 of the center of gravity of the gob 3 in the deflector 12.

A plot of the normal acceleration according to FIG. 11 is applicable either for the central sections 99 according to FIG. 9 or for the central section 102 and the neighbouring sections 103, 103 according to FIG. 10. A curve 105 of the normal acceleration can be divided into a first section (zone) 106, a second section (zone) 107 and a third section (zone) 108. The first section 106 begins preferably not right at the upper end 18 of the associated deflector 12 but a little within the deflector 12 at a point 93 or 96 of the contact zone at which the gob 3 first makes contact with the deflector 12. At this point 93 or 96 the normal acceleration has an initial value 109. The normal acceleration then increases in the first section 106 to an upper value 110. In the second section 107 the normal acceleration increases further but only slightly above the upper level 110 and it falls towards the end of the second section back again to the upper value 110. Finally, in the third section 108, the normal acceleration falls from the upper value 110 to a final value 111 at the lower end 22 of the deflector 12.

A curve 112 of the normal acceleration according to FIG. 12 shows a plot which differs from the curve 105 of FIG. 11. Again, in relation to the curve 112, one can divide it into a first section 113, a second section 114 and a third section 115. In FIG. 12 the upper value 110 of the normal acceleration is achieved somewhat later than in FIG. 11 and is maintained longer than in FIG. 11 with negligible further increase. Thus, the upper value 110 of the normal acceleration is kept smaller than in FIG. 11.

The profile of the path of movement 14 of the center of gravity of the gob 3 in the deflector 12 can be optimized from case to case with the features of the present invention. This presupposes a limitation of jerkiness and moreover a limitation of the maximum acceleration. In each case an entry region for the gobs 3 into the deflectors 12 is set which is inclined only slightly relative to the corresponding trajectory parabola of the gobs 3, and thereby creates low, although definable contact pressures of the gobs 3 against the deflectors 12. The entry region is also chosen to be sufficiently long in order to accept all lengths of gob, before the drastic diversion of the gob 3 takes place in the second section 107, 114. Finally, an exit region of the deflector 12 is provided in which the normal acceleration is reduced in a controlled manner to a value which ensures a clean exit of the gob 3 from the deflector 12 which is free from rotation and drift.

With reference to FIGS. 11 and 12, it is seen that the curvature of the inner slide surface 20 of the deflector 12 along the path of movement 14 of the longitudinal axis of the gob 3 in the deflector 12 can be divided into three characteristic, steplessly connected zones 106 to 108 and 113 to 115 for the acceleration acting on the gobs 3 normal to the direction of movement of the gobs 3. In the first sections 106, 113, the normal acceleration increases from an initial value 109, in a contact zone 93, 96 in which the gob 3 first comes into contact with the deflector 12, to an upper value 110. In the second sections 107, 114, the normal acceleration remains at least approximately at the upper value 110. In the third sections 108, 115, the normal acceleration decreases from the upper value 110 to an end value 111 at the lower and 22 of the deflector 12.

For an even total number of the sections 6 of the I.S. glassware forming machine 97 of FIG. 9, in the two central sections 99 to each side of the central transverse plane 98, or for an odd total number of the sections 6 of the I.S. glassware forming machine 101 of FIG. 10, in the central section 102 in the central transverse plane 98 and in the two neighboring sections 103 on each side of the central section 102, each deflector 12 of the three sections 106 to 108 can have the following relative lengths, taking the total length of the path of movement 14 of the longitudinal axis of the gobs 3 in contact with the deflector 12 as 100%:

The first section 106 extends from the contact zone 93, 96 up to 23% to 29%, preferably up to 26%, the rear end of the second section 107 lies at 34% to 40%, preferably at 37%, and the third section 108 extends over the rest of the total length.

For an even total number of the sections 6 of the I.S. glassware forming machine 97 in which flank sections 100 are provided outwardly on each side of the two central sections 99, or for an odd total number of the sections 6 of the I.S. glassware forming machine 101 in which flank sections 104 are provided outwardly of each of the two neighboring sections 103, the three sections 113 to 115 of each deflector 12 have the following relative lengths, taking the total length of the path of movement 14 of the longitudinal axis of the gobs 3 in contact with the deflector 12 as 100%:

The first section 113 extends from the contact zone 93, 96 up to 32% to 42%, preferably up to 37%, the rear end of the second section 114 lies at 62% to 72%, preferably at 67%, and the third section 115 extends over the rest of the total length.

The inner slide surface of the deflector can be shaped such that the initial value 109 of the normal acceleration amounts to 9% to 20% of the upper value 110 of the normal acceleration, and such that the end value 111 of the normal acceleration amounts to 15% to 19% of the upper value 110 of the normal acceleration.

What is claimed is:

1. A gob delivery apparatus for conducting a gob of molten glass from a gob feeder into at least one mold of a glassware forming machine, wherein the mold has a longitudinal axis, said delivery apparatus comprising:
    a curved scoop for catching the gob coming from the gob feeder and directing it downwards at an angle,
    multiple slide members connected to one another forming a slide unit, each of said multiple slide members being positioned to receive gobs directly from said scoop and including a substantially flat slide member supported fixedly on the machine and including a downwardly inclined upper slide surface for the gob, and
    a curved deflector which has an upper end positioned to receive the gob directly from a lower end of one of said multiple slide members, said deflector shaped to deflect the gob downwards and coaxially with respect to the longitudinal axis of the mold, said deflector being adjustable by means of a first adjustment device in a plane which is perpendicular to the longitudinal axis of the mold.

2. A gob delivery apparatus according to claim 1, further comprising a second adjustment device for raising and lowering said deflector.

3. A gob delivery apparatus according to claim 2, wherein said second adjustment device can raise and lower the deflector along a vertical adjustment axis at a convex rear side of the deflector.

4. A gob delivery apparatus according to claim 3, further comprising:
    a pair of bearing regions spaced from one another provided along the adjustment axis,
    each said bearing region having a first bearing element carried by said first adjustment device and adjustable in said plane, and
    each said bearing region having a second bearing element fixed to the deflector.

5. A gob delivery apparatus according to claim 4, wherein one of the first bearing elements includes a ball member, and one of the second bearing elements is provided with a recess which engages over the ball member from above.

6. A gob delivery apparatus according to claim 5, further comprising:
    a drive member to raise and lower the ball member, wherein the other said first bearing element includes a bearing bolt coaxial with the adjustment axis, and
    wherein the other said second bearing element includes a bearing eye moveable relative to said bearing bolt.

7. A gob delivery apparatus according to claim 6, wherein said bearing bolt comprises a circular cylinder having a flat surface on one side and pivotable about its longitudinal axis, and
    said bearing eye has a lateral aperture having a clear width at least equal to a smallest transverse dimension of the bearing bolt.

8. A gob delivery apparatus according to claim 1, further comprising an alignment device aligning an upper end of said deflector with the gob arriving by way of said one of said multiple slide members.

9. A gob delivery apparatus according to claim 8, wherein:
    said deflector comprises opposed, lateral slide surfaces at said upper end of said deflector; and
    said alignment device comprises a fork which can be raised or lowered about an axis which is fixed relative to the machine, said fork having limbs in sliding contact with said opposed, lateral slide surfaces of said upper end of said deflector.

10. A gob delivery apparatus according to claim 9, wherein each of said limbs has a free end slidably connected to the slide surfaces.

11. A gob delivery apparatus according to claim 8, wherein said alignment device is mounted on said one of said multiple slide members.

12. A gob delivery apparatus according to claim 9, wherein the fork is adjustable in directions of said axis which is fixed relative to the machine.

13. A gob delivery apparatus according to claim 1, wherein the deflector is shaped and positioned relative to said one of said multiple slide members such that, in operation, when the gob first contacts the deflector, a top surface of the gob and an inner slide surface of the deflector form a wedge-shaped gap starting at a point of said contact and widening towards an upper end of the deflector.

14. A gob delivery apparatus according to claim 13, wherein said deflector is positioned relative to said one of said multiple slide members such that, in operation, the gob first comes into contact with the deflector at about half to two-thirds of a length of the gob after the upper end of the deflector.

15. A gob delivery apparatus according to claim 1, wherein said deflector has an inner slide surface comprising first, second and third steplessly connected zones defining a path of movement of the longitudinal axis of the gob and further defining an acceleration acting on the gob normal to the said path, wherein, in the first zone, said inner slide surface is shaped so that the acceleration normal to said path increases from an initial value at a contact point where the gob first contacts the inner slide surface of the deflector to an upper value, wherein, in the second zone, said inner slide surface is shaped so that the acceleration normal to said path remains at least approximately at the upper value, and wherein, in the third zone, said inner slide surface is shaped so that the acceleration normal to said path decreases from the upper value to an end value at a lower end of the deflector.

16. A gob delivery apparatus according to claim 15, wherein the inner slide surface is shaped such that the initial value of the acceleration normal to said path amounts to 9% to 20% of the upper value of the acceleration normal to said path.

17. A gob delivery apparatus according to claim 15, wherein the inner slide surface is shaped such that the end value of the acceleration normal to said path amounts to 15% to 19% of the upper value of the acceleration normal to said path.

18. An I.S. glassware forming machine having a gob delivery apparatus in accordance with claim 15, wherein said I.S. machine has a central transverse plane and an even number of sections, including first and second sections adjacent and on opposing sides of said central transverse plane, respectively, each of said first and second sections including one of said multiple slide members and one said deflector, said inner slide surface of each said deflector having a length L from said contact point where said gob first contacts said inner slide surface to said lower end of said deflector comprising said first, second and third steplessly connected zones wherein:

the first zone extends from said contact point to 23% to 29% of L, the second zone extends from an end of the first zone to 34% to 40% of L, and the third zone extends from an end of the second zone to said lower end of said deflector.

19. An I.S. glassware forming machine having a gob delivery apparatus in accordance with claim 15, wherein said I.S. machine has a central transverse plane and an odd number of sections, including a first section having a longitudinal axis along said central transverse plane, a second section adjacent and on one side of said first section and a third section adjacent and on another side of said first section, each of said first, second, and third sections including one of said multiple slide members and one said deflector, said inner slide surface of each said deflector having a length L from said contact point where said gob first contacts said inner slide surface to said lower end of said deflector comprising said first, second and third steplessly connected zones wherein:

the first zone extends from said contact point to 23% to 29% of L, the second zone extends from an end of the first zone to 34% to 40% of L, and the third zone extends from an end of the second zone to said lower end of said deflector.

20. An I.S. glassware forming machine having a gob delivery apparatus in accordance with claim 15, wherein said I.S. machine has a central transverse plane and an even number of sections including first and second sections adjacent and on opposing sides of said central transverse plane, respectively, each of said first and second sections including one of said multiple slide members and one said deflector, said inner slide surface of each said deflector having a length L from said contact point where said gob first contacts said inner slide surface to said lower end of said deflector comprising said first, second and third steplessly connected zones wherein:

the first zone extends from said contact point to 32% to 42% of L, the second zone extends from an end of the first zone to 62% to 72% of L, and the third zone extends from an end of the second zone to said lower end of said deflector.

21. An I.S. glassware forming machine having a gob delivery apparatus in accordance with claim 15, wherein said I.S. machine has a central transverse plane and an odd number of sections, including a first section having a longitudinal axis along said central transverse plane, a second section adjacent and on one side of said first section and a third section adjacent and on another side of said first section, each of said first, second, and third sections including one of said multiple slide members and one said deflector, said inner slide surface of each said deflector having a length L from said contact point where said gob first contacts said inner slide surface to said lower end of said deflector comprising said first, second and third steplessly connected zones wherein:

the first zone extends from said contact point to 32% to 42% of L, the second zone extends from an end of the first zone to 62% to 72% of L, and the third zone extends from an end of the second zone to said lower end of said deflector.

22. An I.S. glassware forming machine having a gob delivery apparatus in accordance with claim 1, said I.S. machine having a central transverse plane, and said gob delivery apparatus being adjacent to said central transverse plane.

23. An apparatus for delivering a gob of molten glass from a gob feeder to a mold of a glassware forming machine, comprising:

a curved scoop positioned to receive the gob from the gob feeder and direct the gob downwards at an angle;

a slide unit comprising multiple slide members connected to one another, each of said multiple slide members disposed to receive gobs directly from said scoop and including a slide member formed as a substantially flat plate member supported fixedly relative to the glassware forming machine, said slide member having a downwardly inclined upper slide surface on which the gob slides; and a curved deflector positioned to receive the gob directly from one of said multiple slide members, said deflector shaped to deflect the gob downwards and coaxially with respect to a longitudinal axis of the mold, said deflector being adjustable in a plane which is perpendicular to a longitudinal axis of the mold.

24. A device in accordance with claim 23 wherein said slide unit includes multiple slide channels, said slide channels being part-circular in cross section.

* * * * *